United States Patent [19]

Iwata et al.

[11] 4,431,288
[45] Feb. 14, 1984

[54] CAMERA WITH LIQUID CRYSTAL APERTURE CONTROL MEANS

[75] Inventors: Hiroshi Iwata; Tsunemi Yoshino, both of Nara, Japan

[73] Assignee: West Electric Co., Ltd., Osaka, Japan

[21] Appl. No.: 378,421

[22] Filed: May 14, 1982

[30] Foreign Application Priority Data

May 14, 1981 [JP] Japan .................................. 56-73049

[51] Int. Cl.³ .......................... G03B 3/00; G03B 7/087
[52] U.S. Cl. ............................... 354/446; 354/149.11; 354/227.1; 354/271.1
[58] Field of Search ................. 354/40, 126, 149, 227, 354/229, 230, 270, 271, 43

[56] References Cited

U.S. PATENT DOCUMENTS 2,043,901 6/1936 Mihályi .............................. 354/271
3,766,841 10/1973 Finnegan et al. .................... 354/270
4,316,658 2/1982 Bundschuh et al. ................. 354/43

Primary Examiner—Russell E. Adams
Attorney, Agent, or Firm—Burgess, Ryan and Wayne

[57] ABSTRACT

A camera with a liquid crystal aperture stop means has a shift means adapted to shift the liquid crystal aperture stop means between a plurality of positions depending upon exposure conditions.

6 Claims, 3 Drawing Figures

CAMERA WITH LIQUID CRYSTAL APERTURE CONTROL MEANS

BACKGROUND OF THE DISCLOSURE

The present invention relates to a camera with a liquid crystal aperture stop means.

In order to set a desired f-number, cameras have long used mechanical diaphragms or apertures comprising a plurality of thin metal leaves, but recently there has been devised and demonstrated electronically controlled liquid crystal aperture control or stop means which is based upon the principle that when an electric field is applied to a liquid crystal which is sandwiched between two sheets of glass, it becomes turbulent and scatters light. There have been also devised and demonstrated electronically controlled camera aperture control means which comprise polarizing plates and TN liquid crystals. The latter means have the advantages that the contrast ratio can be increased and the depth of field can be varied.

Liquid crystal aperture control means have the common advantages that their electronic controls can be facilitated and they can be easily combined with automatic control means, but they have also some defects. For instance, they cause the losses of quantity of light reaching the film. Light transmission losses are dependent upon the transmission coefficients of sheets of glass upon which are deposited transparent electrodes or polarizing plates which are used to enhance the transmission of light through the liquid crystal aperture control means. As compared with the mechanical aperture control means, the light transmission losses through the liquid crystal aperture control means are worse by about 10% or about 1 EV (exposure value) or one step in f-number. As a result, the distance at which an object can be satisfactorily exposed with the aid of a flash is decreased especially in cases of cameras with a built-in electronic flash device. To overcome this problem, compared with cameras with mechanical aperture control means, those with liquid crystal aperture control means must use large main flash capacitors if the same aperture is used.

SUMMARY OF THE INVENTION

The primary object of the present invention is, therefore, to provide a camera in which a liquid crystal aperture control means can be shifted between a plurality of positions depending upon exposure conditions.

Briefly stated, to the above and other ends, the present invention provides a bias means which is adapted to maintain the liquid crystal aperture control means normally at a first position outside of the photographic optical system; that is, the path from the photographic lens to the film; an arresting means which is adapted to retain, against the bias means, the crystal liquid aperture control means in a second position which is located in the optical system; and a control means which is adapted to actuate the arresting means, these three means constituting a shifting means of liquid crystal aperture control means.

The above and other objects, effects and features of the present invention will become more apparent from the following description of some preferred embodiments thereof taken in conjunction with the accompanying drawing.

DESCRIPTION OF THE PREFERRED EMBODIMENTS

Figure 1:
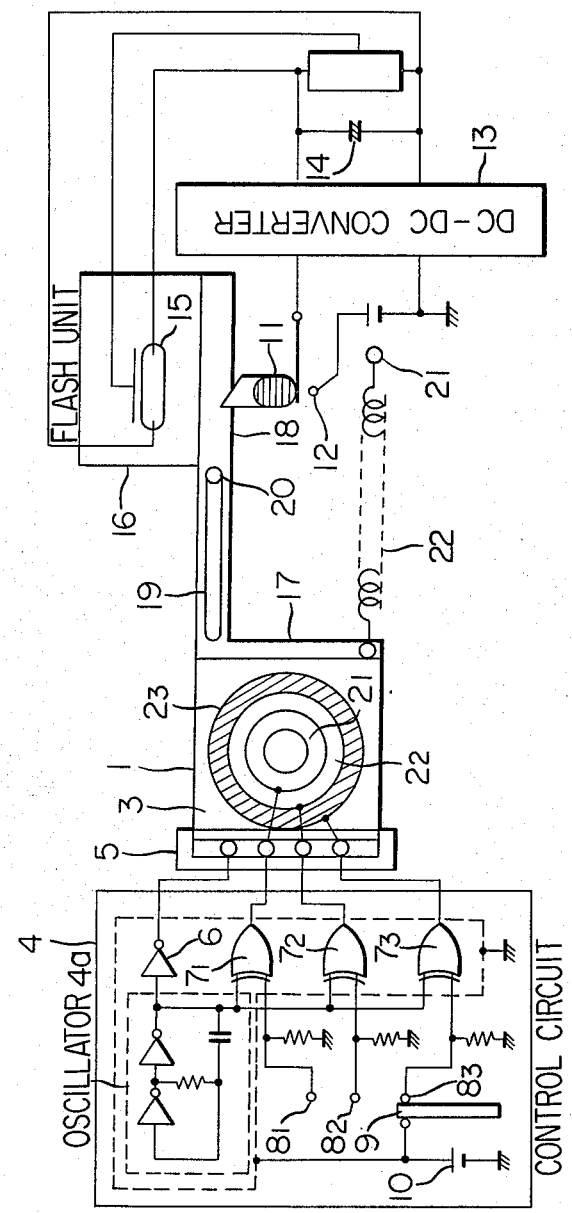
FIGS. 1, 2 and 3 show first, second and third embodiments, respectively, of the present invention.

In FIG. 1 is shown a first embodiment of the present invention; that is, a camera with a built-in electronic flash, in which a liquid crystal aperture stop means can be retracted manually from the photographic optical system. A liquid crystal aperture stop means 1 has a group of annular electrodes $2_1$ to $2_3$ which are coaxial with each other and with the optical axis of a photographic lens (not shown) and are disposed in opposed relationship with a common electrode 3. Therefore, if a voltage is established between a selected annular electrode or electrodes $2_1$ and $2_3$ and the common electrode 3, an annular liquid crystal pane or panes between them become opaque so that a desired aperture stop can be set.

The selection and setting of a desired aperture stop can be controlled in response to the signal from a control circuit 4 through a connection or coupling means 5. The connection or coupling means 5 has a plurality of conductors or connector means adapted to be firmly but releasably pressed against the glass electrodes of the liquid crystal aperture stop means 1.

In the control circuit 4 an oscillator $4_a$ is connected through an inverter 6 and a plurality of exclusive OR gates $7_1$, $7_2$ and $7_3$ to the annular electrodes 2 and the common electrode 3 of the liquid crystal aperture stop means 1. If the voltage signal applied to the common electrode 3 is in phase with those applied one or more annular electrodes 2, there is no voltage difference between them so that the liquid crystal panes between them are transparent. On the other hand, when the voltage signal applied to the common electrode 3 is out of phase with those applied to the annular electrodes 2, the liquid crystal panes between the annular and common electrodes 2 and 3 become opaque; that is, the liquid crystal aperture stop means 1 is stopped down. For instance, in order to make the liquid crystal pane between the common electrode 3 and the outermost annular electrode $2_3$ opaque, the voltage from a battery 10 is applied to one of input terminals $8_3$ of the exclusive OR gate $7_3$ through a slide switch 9 which is operatively coupled to an aperture setting ring (not shown).

The mode of operation of the first embodiment will be described in more detail below. Assume that an object is dark, so that a flash exposure is needed. Then, a switch lever or knob 11 must be pushed down in FIG. 1 to close an ON-OFF switch 12 of the built-in electronic flash system. The energy supplied from a DC-DC converter 13 is gradually stored on a main flash capacitor 14.

When the switch lever or knob 11 is pushed down, it is released from a wedge-shaped recess 18 of a connecting plate 17 which interconnects between the liquid crystal aperture stop means 1 and a flash unit 16 in which is housed a flash tube 15. Consequently, under the force of the force of a compression coil 22 loaded between the connecting plate 17 and a stationary pin 21, the connecting plate 17 is caused to move to the right in FIG. 1 a distance equal to the length of an elongated guide slot 19 of the connecting plate 17. The movement of the connecting plate 17 to the right or left is guided by a guide pin 20 fitted into the elongated guide slot 19.

As a consequence, the liquid crystal aperture stop means 1 is released from the connection or coupling means 5 and retracted from the photographic optical system so that the light rays reflected back from the object are not prevented from reaching a film (not shown) by the liquid crystal aperture stop means 1. As a result, the distance at which an object can be satisfactorily exposed with the aid of a flash can be increased.

Figure 2:
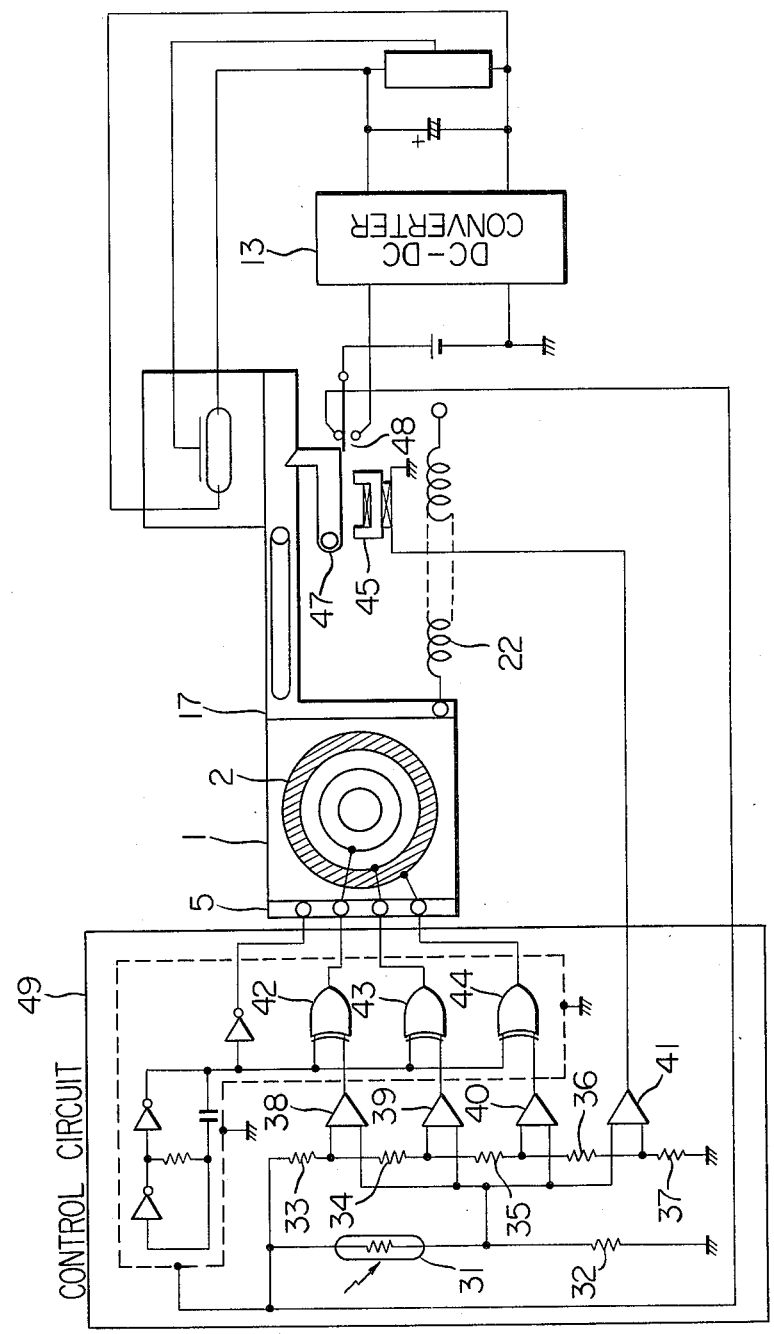

In FIG. 2 is shown a second embodiment of the present invention in which an automatic exposure control circuit automatically can not only close the ON-OFF switch of the electronic flash device but also simultaneously retract of the liquid crystal aperture stop means away from the photographic optical system as will be described in detail below.

The brightness of an object is measured by a photoelectric transducer 31 and is obtained in terms of the voltage across a resistor 32. This voltage is compared by comparators 38 to 41 with reference voltages which are set by a voltage divider comprising series-connected resistors 33 and 37. The outputs from these comparators 38 to 41 are applied to one input terminals of exclusive OR gates 42 to 44 and to an electromagnet 45, respectively. Therefore, the second embodiment can automatically control not only the setting or retraction away from the optical system of the liquid crystal aperture stop means 1 but also the ON-OFF switch of the electronic flash device.

FIG. 2 shows that the level of the output from the photoelectric transducer 31 is between the reference levels of the comparators 39 and 40 so that the liquid crystal aperture stop means 1 is set in response to the output from the exclusive OR gate 44. If the level of the output from the transducer 31 is lower than the reference level set by the comparator 41; that is, when the brightness of an object is too dark, the output from the comparator 41 energizes the electromagnet 45, so that an arresting lever 47 is attracted toward the magnet 45 and released away from the connecting plate 17. As a result, the liquid crystal aperture stop means 1 is retracted away from the optical system in the manner described above in conjunction with the first embodiment with reference to FIG. 1. When the arresting lever 47 is pulled down, it causes an ON-OFF switch 48 to disconnect a power supply from the control circuit 49 but connect the power supply to the DC-DC converter 13, whereby the waste of power by the control circuit 49 can be prevented.

Figure 3:
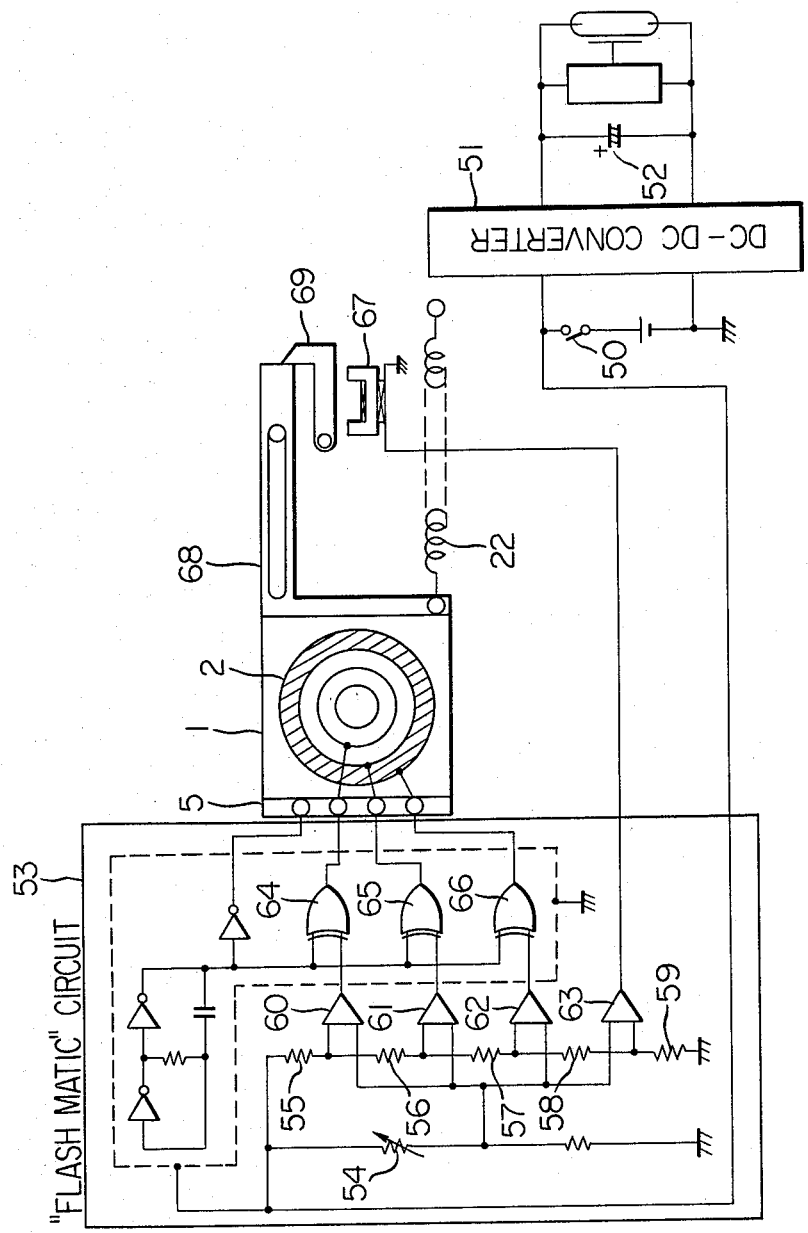

In FIG. 3 is shown a third embodiment of the present invention of the type which incorporates a "Flash Matic" system so that if an object is located beyond a predetermined distance away from the camera, the liquid crystal aperture stop means 1 can be automatically retracted away from the optical path of the photographic lens. In order to make cameras with a built-in electronic flash system compact in size and light in weight, their flash tubes are so arranged as to be flashed at their full capacities. As a result, in order to attain an optimum flash exposure, the aperture must be set depending upon the distance to an object; that is, the value obtained by multiplying the distance to an object by the selected aperture number must be set equal to a guide member. The camera, however, has the smallest f-number beyond which it is impossible to open further the aperture. Therefore, according to the third embodiment of the present invention, if the distance to an object to be photographed is beyond a predetermined distance, the liquid crystal aperture stop means 1 is retracted away from the optical system so that the losses of transmission of light rays through the aperture stop; that is, the liquid crystal panes, can be eliminated. Thus, according to the third embodiment, the distance at which an object can be satisfactorily flash-exposed can be increased.

Referring still to FIG. 3, the mode of operation of the third embodiment will be described in more detail below. When an ON-OFF switch 50 is closed, a DC-DC converter 51 in the electronic flash system is energized so that the energy is stored on a main flash capacitor 52. Concurrently, a "Flash Matic" circuit 53 is also energized. The resistance value of a variable resistor 54 varies depending upon the shift of a photographic lens (not shown) so that the distance to an object can be obtained in terms of a voltage signal. This voltage signal is compared by comparators 60 to 63 with reference levels previously set by a voltage divider comprisiing series-connected resistors 55 to 59. The outputs of the comparators 60 to 63 are connected to one input terminals of exclusive OR gates 64 to 66, respectively, and the output of the comparator 63 is connected to an electromagnet 67. In response to the outputs from the exclusive OR gates 64 to 66, the liquid crystal aperture stop means 1 is controlled as described hereinbefore. If the output from the variable resistor 54 is lower in level than the reference level set by the comparator 63, the latter energizes the electromagnet 67 so that it attracts an arresting lever 69 away from a connecting plate 68. As a result, the liquid crystal aperture stop means 1 is retracted away from the optical path of the photographic lens in a manner substantially similar to that described with reference to the first embodiment (FIG. 1).

In summary, according to the present invention, the liquid crystal aperture stop means can be retracted away from the optical path of the photographic lens as needs demand. As a consequence, easier electronic controls of cameras can be attained without adversely affecting their performance. Thus, the present invention contributes much to further improvements of cameras.

What is claimed is:

1. A camera with a liquid crystal aperture stop means characterized by
   a bias means which is adapted to maintain said liquid crystal aperture stop means normally at a first position,
   an arresting means which is adapted to retain said liquid crystal aperture stop means at a second position against said bias means, and
   a control means which is adapted to control said arresting means, whereby said crystal liquid aperture stop means can be selectively retracted away from the photographic optical system.

2. A camera with a liquid crystal aperture stop means as set forth in claim 1, wherein said control means is adapted to be actuated in response to the energization of an electronic flash device so that said liquid crystal aperture stop means can be retracted away from said photographic optical system when said electronic flash device is used.

3. A camera with a liquid crystal aperture stop means as set forth in claim 1, wherein said control means is adapted to be actuated in response to the output signal from a photoelectric transducer means which is incorporated in an automatic exposure control circuit for controlling said liquid crystal aperture stop means and which is adapted to detect the brightness of an object, whereby if the brightness of an object is less than a predetermined level, said liquid crystal aperture stop means is retracted away from said photographic optical system.

4. A camera with a liquid crystal aperture stop means as set forth in claim 1, wherein said stop means is adapted to be actuated in response to the output from a detection means which is incorporated in a "Flash Matic" means for controlling the setting of said liquid crystal aperture stop means and which is adapted to co-act with a photographic lens so as to detect the distance to an object in terms of the shift of said photographic lens, whereby if the shift of said photographic lens is less than a predetermined amount; that is, if the distance to an object is beyond a predetermined distance, said liquid crystal aperture stop means is retracted away from said photographic optical system.

5. A camera with a liquid crystal aperture stop means as set forth in claim 1, wherein said liquid crystal aperture stop means is outside of said photographic optical system when the former is placed and maintained in said first position, but in said second position, said liquid crystal aperture stop means is interposed in said photographic optical system.

6. A camera with a liquid crystal aperture stop means as set forth in claim 1, 2, 3, 4 or 5, wherein said crystal liquid aperture stop means includes a glass plate substrate and a group of electrodes which can be mechanically made into contact with output signal terminals, respectively, of a drive means for controlling said liquid crystal aperture stop means.

* * * * *